March 6, 1945. J. GAISBERGER 2,370,949
COMBINED STEAM AND GAS OR DIESEL POWER PLANT
Filed June 23, 1942 4 Sheets-Sheet 1

INVENTOR.
JOSEPH GAISBERGER
BY J. Freeman
ATTORNEY

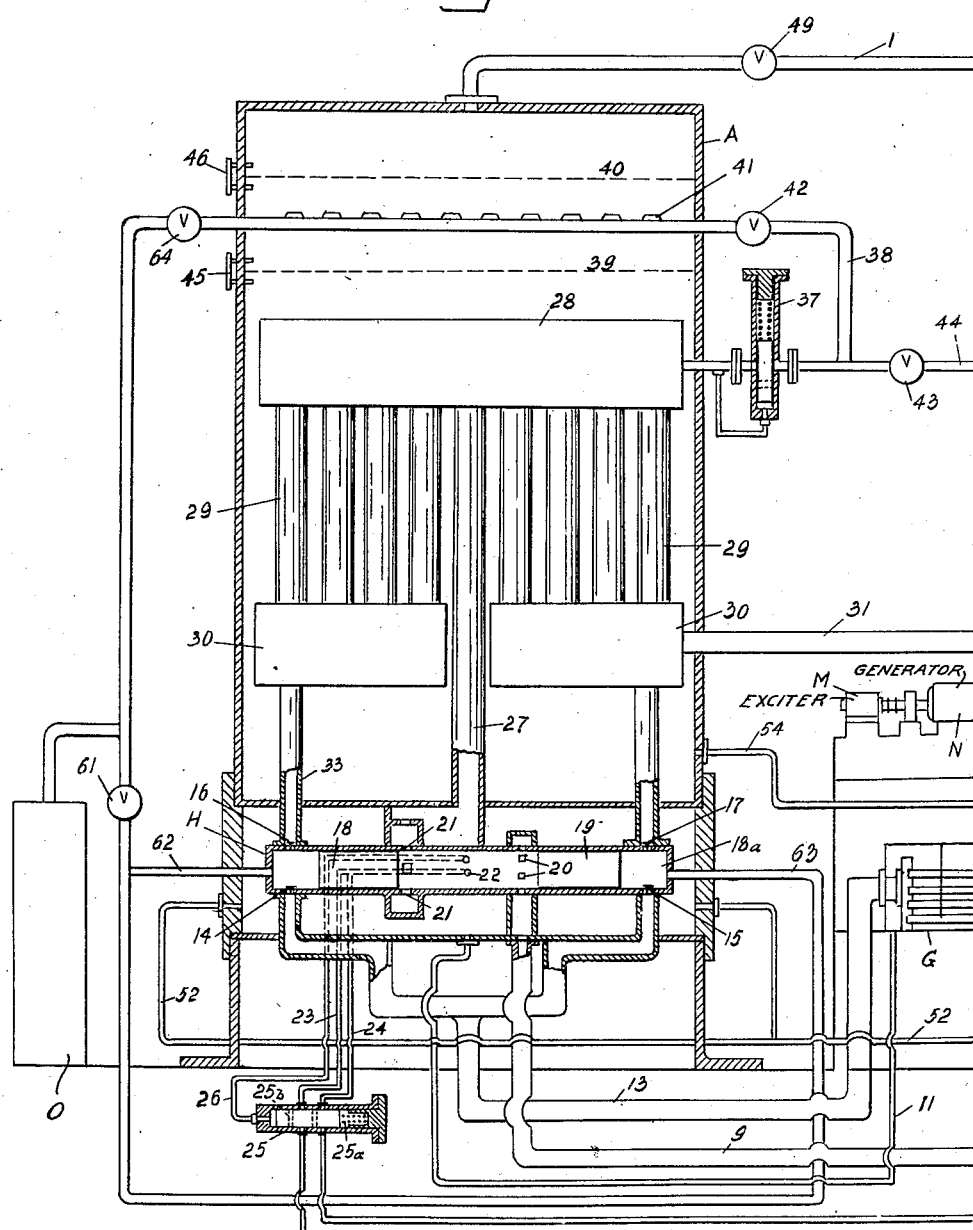

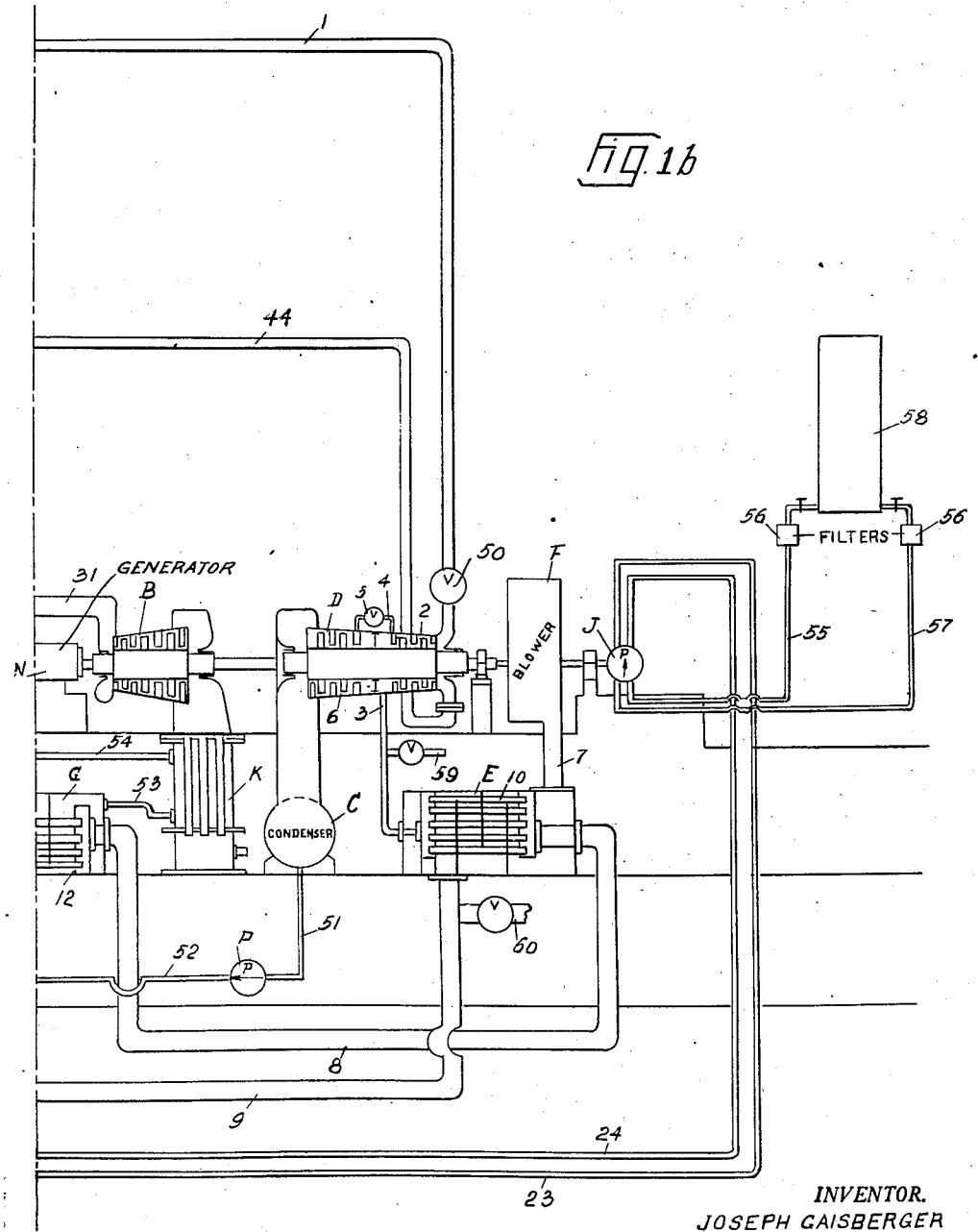

March 6, 1945. J. GAISBERGER 2,370,949
COMBINED STEAM AND GAS OR DIESEL POWER PLANT
Filed June 23, 1942 4 Sheets-Sheet 4

INVENTOR.
JOSEPH GAISBERGER
BY
ATTORNEY

Patented Mar. 6, 1945

2,370,949

UNITED STATES PATENT OFFICE 2,370,949

COMBINED STEAM AND GAS OR DIESEL POWER PLANT

Joseph Gaisberger, Valparaiso, Chile

Application June 23, 1942, Serial No. 448,138

9 Claims. (Cl. 60—11)

The invention relates to a combined steam and fuel power plant in which steam is circulated in a closed cycle, and it relates particularly to a plant in which a steam boiler, a steam turbine and a Diesel steam compressor are functionally coupled in the closed steam circuit system.

It is one of the important objects of the invention to reduce in a plant of this type the heat energy losses due to condensation of the steam in the turbine.

It is another important object of the invention to utilize the circulating steam to preheat the combustion air for the Diesel steam compressor and the feed water for the steam generator as well as the use of the exhaust gases of the compressor for an additional preheating of the feed water.

It is also an object of the invention to heat in the boiler composed of a steam generator and a heater a smaller quantity of steam at a constant pressure and a larger quantity of steam at a constant volume until the normal working steam pressure is reached.

It is also an object of the invention to utilize the Diesel compressor at the same time for the compression of the circulating steam and of the combustion air.

It is a further object of the invention to improve the efficiency of the boiler by an increase of the flow velocity of the heating gases exhausted from the compressor and by a counter-current conduction of the steam and the compressor exhaust gases.

It is another object of the invention to prevent the delivery of fuel to the compressor before a predetermined pressure of the combustion air has been reached.

Figure 1:
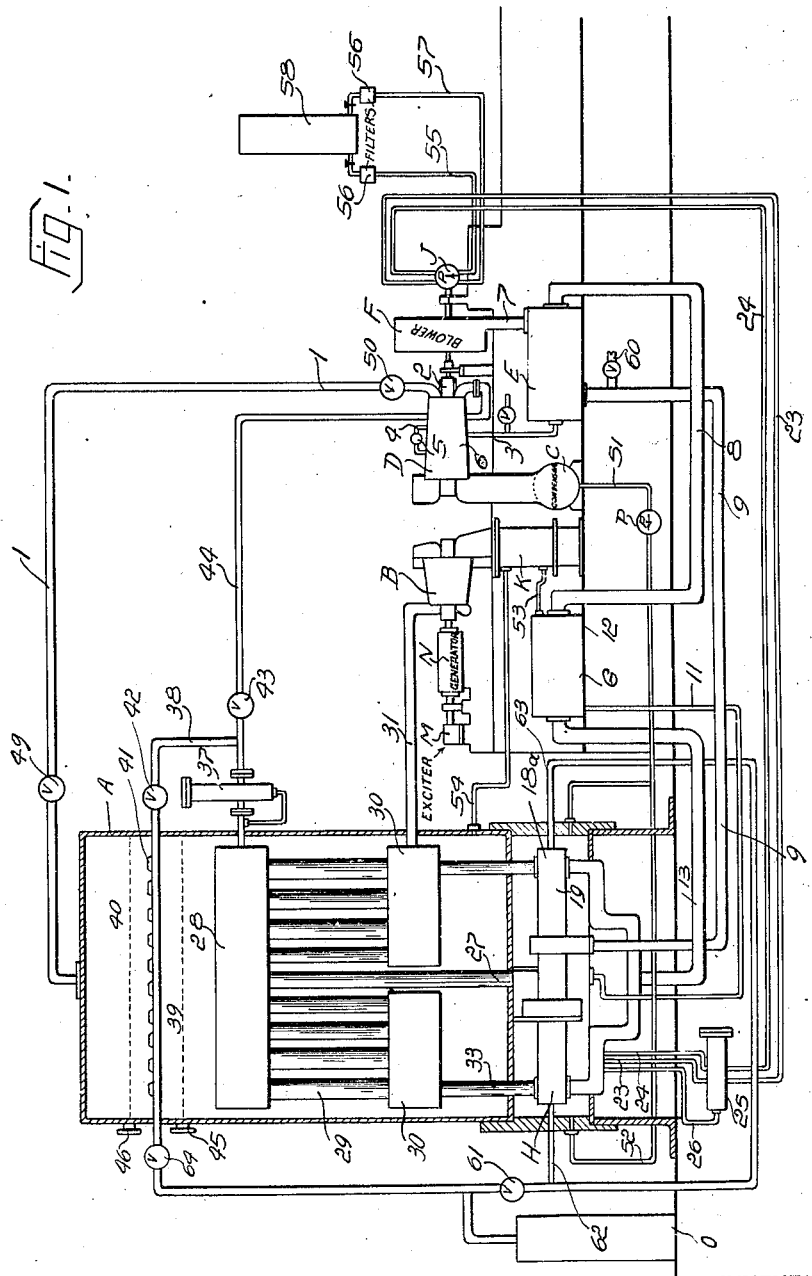
Figure 2:
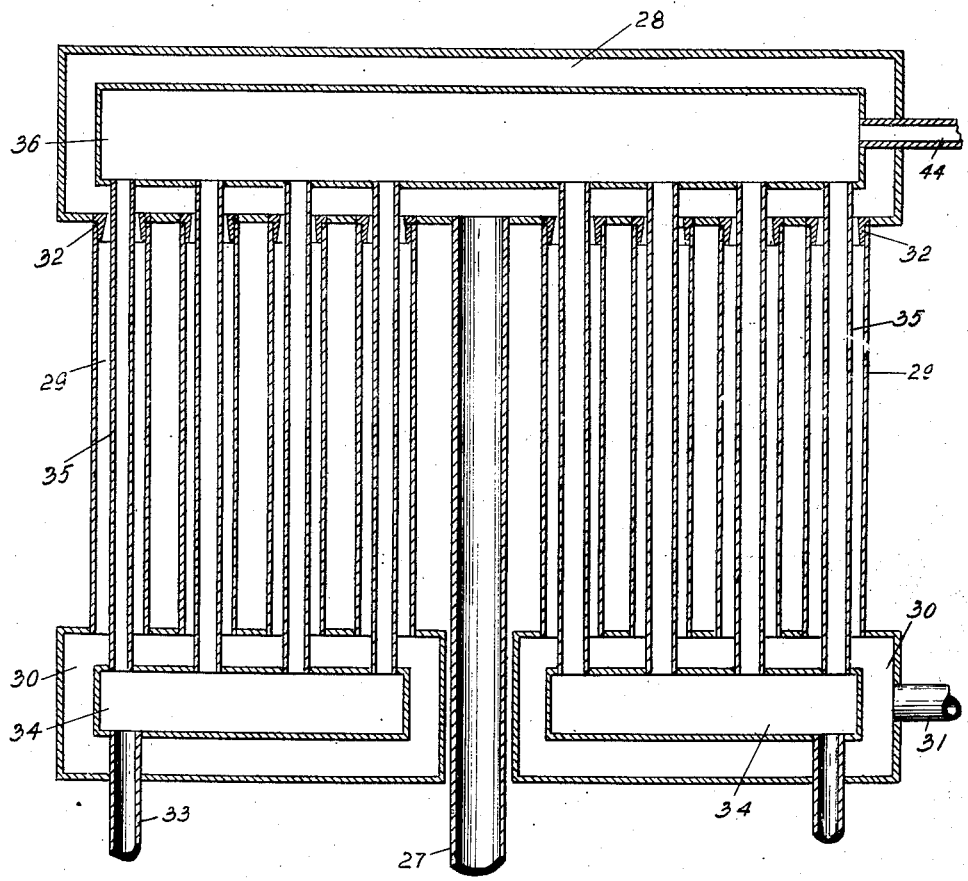

With these and other objects in view which will become apparent as this specification proceeds, the invention is illustrated by way of example in the annexed drawings, of which Fig. 1 shows a diagrammatical view of my combined steam and fuel power plant, Fig. 1a and Fig. 1b show on an enlarged scale a more detailed view of the left and the right hand half of the plant, Fig. 2 shows on a still more enlarged scale a vertical section of the structure in the boiler which utilizes the heat of the exhaust gases of the compressor to heat the compressed steam and to generate steam from the water within the boiler.

The power plant embodying my invention consists of one or more boilers A to drive a steam turbine D and a gas turbine B or another adequate motor.

The steam produced in the boiler A flows through the pipe-line 1 to the steam turbine D; the greater part of the steam, for instance 80%, having passed the high pressure drum 2 of the steam turbine D is conducted through tube 3 for circulation through the plant; the remainder of the steam, for instance 20%, flows through tube 4 and control valve 5 to the low pressure drum 6 of the steam turbine and from there to condenser C where the exhaust steam is condensed.

The greater part of the steam flows through tube 3 into the air preheater E to which air is supplied through tube 7 from a blower F.

The air preheater E contains a system of tubes 10, the steam flowing through the interior of the tubes, while the air coming from tube 7 flows along the outside of the tubes and is preheated thereby, the steam being cooled at the same time.

The steam which is thus primarily cooled by air flows for a second cooling through pipe line 8 to the water preheater G; this water preheater contains a system of tubes 12; the steam flows through the inner space of the tubes and feed water flows along the outside thereof; the feed water enters through tube 11 and is preheated, while the steam is cooled and conveyed through tube 13 to the Diesel steam compressor H which may be installed underneath or at the side of the boiler A.

Free oscillating pistons 18 and 19 are movable in cylinder 18a of the steam compressor which is provided with steam inlet valves 14, 15 and steam outlet valves 16, 17.

The pistons 18, 19 and the compressor cylinder are arranged in a customary manner to produce a Diesel two stroke cycle, producing thereby the desired steam compressing work.

For this purpose the cylinder of the steam compressor is provided with air inlet ports 20 and has exhaust ports 21; preheated air is supplied to inlet ports 20 from tube 9 at a pressure of between 2 to 7 lbs./sq. inch or more.

When the pistons 18, 19 are moved towards the center of the cylinder, the fresh air introduced through ports 20 is compressed considerably; any high pressure may be used for the operation of the Diesel process; somewhat before the inner dead center is reached by the pistons 18, 19, fuel is injected by fuel inlet 22.

The fuel is fed to fuel inlet 22 by tubes 23, 24 coming from fuel pump J which may have any suitable known construction and therefore is diagrammatically shown in the drawings.

Means are provided to prevent the injection of the fuel from taking place before the air is compressed to the high pressure which is desired between the pistons 18, 19; for this purpose an automatic valve 25 is provided which does not permit the fuel to pass through tubes 23, 24 unless the desired air pressure is attained; a controlling air conduit 26 is arranged between the compressor cylinder and valve 25 and a pressure actuated spring 25a is provided in the valve. When the pressure of the compressed air has been sufficiently increased to overcome the tension of spring 25a, the air displaces a movable piston 25b located in valve 25 until bores provided in the piston are alined with tubes 23, 24 and the fuel can now pass through the bores and these tubes to fuel inlet 22.

The pistons 18, 19 are forced by the combustion occurring in the Diesel steam compressor H to their outer positions, whereby the exhaust ports 21 and the air inlet ports 20 are uncovered and brought in operating connection with the compressor cylinder.

The exhaust gases flow from the ports 21 through the tube 27 to the heating space of boiler A while through the ports 20 fresh air enters for the next combustion cycle.

The exhuast gases flow through tube 27 upwards into chamber 28. The flow direction of the gases is inverted in this chamber and the gases flow now downwards through heating tubes 29 to chamber 30 which is connected with the gas turbine B by pipe 31.

In order to more completely utilize the gas pressure expansion nozzles 32 are located at the inlet section of tubes 29, whereby the downward velocity of the gases is increased.

The water level of the boiler A may be held, as desired, at 39 or 40; the levels are indicated by gauges 45, 46.

The exhaust gas chamber and tube system 28, 29, 30 are traversed by tubes 35 connecting the steam heating chambers 34 and 36.

The steam which flows to the Diesel steam compressor H through tube 13 is fed to the outer end of the compressor cylinder by valves 14, 15. The compressor H compresses the steam to a pressure which is higher than the working pressure of the boiler A; the compressed steam flows through tubes 33 into steam chamber and tube system 34, 35, 36 where the temperature and pressure are increased at a constant volume until automatic valve 37 built on identical lines as automatic valve 25 is opened, and permits the steam to flow through tube 38 and nozzles 41 into the water space of the boiler A according to the water level being held underneath or above tube 38.

By closing valve 42 and opening valve 43 the steam may be conducted from the steam chamber and tube system 34, 35, 36 through pipeline 44 directly to the high pressure drum of the steam turbine D.

In this case only such quantity of steam flows through pipe 1 to turbine D as is produced at constant pressure by the heat in the outer part of the gas chamber and in tube system 28, 29, 30 according to the quantity of feed water introduced into boiler A.

Feed water will be transported from condenser C through the tube 51 by a customary feed water pump P and conducted through tube 52 to the Diesel steam compressor H in order to cool the same; it is then conducted through pipeline 11 to the feed water preheater G and through tube 53 to the feed water preheater K where the exhaust gases of the gas turbine B are cooled; finally and after its third preheating the feed water is supplied by pipeline 54 into boiler A.

The fugel pump J which may be of any conventional type and, therefore, is only shown in symbol in the drawings, is driven directly by the shaft of the steam turbine D by means of a suitable change gear device, not shown in the drawings.

The fuel pump J receives the fuel from tank 58, the fuel passing through filters 56 and pipelines 55 and 57.

In the case that in an industrial plant, such as a foundry of a heating plant the delivery of a certain quantity of steam or hot air is desired, this air may be supplied from tube 60, whereas steam may be delivered from tube 59.

In this case the air preheater E and the Diesel steam compressor will be reduced in size without an influence being exerted on the combustion process; the quantity of additional air is decreased and a smaller compression ratio in the Diesel process may be used.

The drawings show a three-phase electric generator N and has exciter M mounted on the shaft of the turbine.

For the starting of the plant the compressor is charged with steam from the auxiliary boiler O through tubes 62, 63; the valves 61, 64 being opened; the pistons 18, 19 move inwards, whereby the air between the pistons is compressed; hereafter the valves 61, 64 are closed and fuel is forced by fuel pump J to the fuel inlet 22; the Diesel steam compressor makes its first ignition by the use of customary ignition means, not shown in the drawings; upon full opening of the steam valves 43, 49 and 50 the working of the power plant commences.

In the above described plant also gaseous fuels may be employed; in this case the blower F supplies not only pure air but a mixture of gas and air as fuel to the gas motor steam compressor, the gas and the necessary air quantity being regulated in a well known manner by a valve in the suction conduit of the blower.

The gas and air mixture between the pistons 18, 19 will be ignited by injection of a liquid fuel supplied by fuel pump J and inlet 22.

I claim:

1. A steam and fuel power plant comprising in a closed circuit system a steam boiler, a turbine, means to conduct the steam from said boiler to said turbine, a Diesel steam compressor, means to withdraw the larger portion of the steam from the said turbine and to conduct the same to the said compressor, air and fuel inlet and exhaust outlet members for the compressor, means to supply fuel to the said fuel inlet members and air to the said air inlet members, a steam generating space within said boiler, means to supply feed water to said steam generating space, a heating chamber within said boiler to utilize the heat of the exhaust gases to heat the compressed steam and to generate steam from the water within the boiler, means to conduct the exhaust gases from said compressor to said heating chamber, a chamber within said boiler for the compressed steam, said chamber being arranged in heat conductive relation to said exhaust gases carrying chamber, and means to conduct the compressed steam from said compressor to said compressed steam carrying chamber.

2. A steam and power plant comprising in a closed circuit system a steam boiler, a steam and a gas turbine, means to conduct the steam from said boiler to said steam turbine, a Diesel steam compressor, means to withdraw the larger portion of the steam from the said steam turbine and to conduct the same to the said compressor, air and fuel inlet and exhaust outlet members for the compressor, means to supply fuel to the said fuel inlet members and air to the said inlet members, a steam generating space within said boiler, means to supply feed water to said steam generating space, a heating chamber within said boiler to utilize the heat of the exhaust gases to heat the compressed steam and to generate steam from the water within the boiler, means to conduct the exhaust gases from said compressor to said heating chamber, a chamber within said boiler for the compressed steam, said chamber being arranged in heat conductive relation to said exhaust gases carrying chamber, means to conduct the compressed steam from said compressor to said compressed steam carrying chamber, and means to conduct the exhaust gases from said heating chamber to said gas turbine.

3. A steam and fuel power plant comprising in a closed circuit system a steam boiler, a turbine having a high pressure and a low pressure drum, means to conduct the steam from said boiler to said high pressure drum, a Diesel steam compressor, a pipe system to withdraw the larger portion of the steam from said high pressure drum and to conduct the same to the said compressor, tubular coolers for the steam in said pipe system, means to conduct the smaller portion of the steam to the lower pressure drum of said turbine, a condenser for the condensation of said smaller steam portion, means to utilize said condensate for the cooling of said compressor, air and fuel inlet and exhaust outlet members for the compressor, means to supply fuel to the said fuel inlet members and air to the said air inlet members, means to conduct said air for preheating purposes through at least one of said tubular steam coolers, a steam generating space within said boiler, means to supply feed water to said steam generating space, a heating chamber within said boiler to utilize the heat of the exhaust gases to heat the compressed steam and to generate steam from the water within the boiler, means to conduct the exhaust gases from said compressor to said heating chamber, a chamber within said boiler for the compressed steam, said chamber being arranged in heat conductive relation to said exhaust gases carrying chamber, and means to conduct the compressed steam from said compressor to said compressed steam carrying chamber 4. A steam and fuel power plant comprising in a closed circuit system a steam boiler, a turbine having a high pressure and a low pressure drum, means to conduct the steam from said boiler to said high pressure drum, a Diesel steam compressor, a pipe system to withdraw the larger portion of the steam from said high pressure drum and to conduct the same to the said compressor, means to conduct the smaller portion of the steam to the low pressure drum of said turbine, a condenser for the condensation of said smaller steam portion, means to utilize said condensate to cool said compressor, air and fuel inlet and exhaust outlet members for the compressor, means to supply fuel to the said fuel inlet members and preheated air to the said air inlet members, a steam generating space within said boiler, means to supply said condensate to said steam generating space, a heating chamber within said boiler to utilize the heat of the exhaust gases to heat the compressed steam and to generate steam from the water within the boiler, means to conduct the exhaust gases from said compressor to said heating chamber, a chamber within said boiler for the compressed steam, said chamber being arranged in heat conductive relation to said exhaust gases carrying chamber and means to conduct the compressed steam from said compressor to said compressed steam carrying chamber.

5. A steam and fuel power plant comprising in a closed circuit a steam boiler, a turbine, means to conduct the steam from said boiler to said turbine, a Diesel steam compressor, means to withdraw the larger portion of the steam from the said turbine, a plurality of heat exchangers, means to conduct said larger steam portion through said heat exchangers into said compressor, air and fuel inlet and exhaust outlet members for the compressor, means to supply fuel to the said fuel inlet members and preheated air to the said air inlet members, a cylinder in the said compressor, freely oscillating coaxial pistons in said cylinder to compress the steam and the combustion air, a steam generating space within said boiler, means to supply feed water to utilize the heat of the exhaust gases to heat the compressed steam and to generate steam from the water within the boiler, means to conduct the exhaust gases from said compressor to said heating chamber, a chamber within said boiler for carrying the compressed steam, said chamber being arranged in heat conductive relation to said exhaust gases carrying chamber and means to conduct the compressed steam from said compressor to said compressed steam carrying chamber.

6. A steam and fuel power plant comprising in a closed circuit system a steam boiler, a turbine, means to conduct the steam from said boiler to said turbine, a Diesel steam compressor, means to withdraw the larger portion of the steam from the said turbine, a plurality of heat exchangers inserted in said closed circuit system, means to conduct said larger steam portion through the said heat exchangers into said compressor, air and fuel inlet and exhaust gas outlet members for the compressor, pipes to supply fuel to the said fuel inlet members and air to said air inlet members, a cylinder in said compressor, two coaxial freely oscillating pistons in said cylinder to compress by their outward stroke the steam and by their inward stroke the air, a control element in the fuel supply pipe, said element being automatically responsive to the compression of the combustion air to admit fuel to said compressor only upon a predetermined compression being reached, a steam generating space within said boiler, means to supply feed water to said steam generating space, a heating chamber within said boiler to utilize the heat of the exhaust gases to heat the compressed steam and to generate steam from the water within the boiler, means to conduct the exhaust gases from said compressor to said heating chamber, a chamber within said boiler for carrying the compressed steam, said chamber being arranged in heat conductive relation to said exhaust gas carrying chamber, and means to conduct the compressed steam from said compressor to said compressed steam carrying chamber.

7. A steam and fuel power plant comprising in a closed steam circuit system a steam boiler, a turbine, means to conduct the steam from said boiler to said turbine, a Diesel steam compressor, means to withdraw a larger portion of the steam from the said turbine and to conduct the same to said compressor, said compressor being located underneath said steam boiler and in direct vicinity thereto, air and fuel inlet and exhaust outlet members for the compressor, pipes to supply fuel to the said fuel inlet members and combustion air to the said air inlet members, means to preheat said combustion air, a steam generating space within said boiler, means to supply feed water to said steam generating space, a heating chamber within said boiler to utilize the heat of the exhaust gases to heat the compressed steam and to generate steam from the water within the boiler, means to conduct the exhaust gases from said compressor to said heating chamber, the latter consisting of a lower and of an upper section and of tubes connecting said two chamber sections, a chamber within said boiler for carrying the compressed steam, means to conduct the compressed steam from said compressor to said compressed steam carrying chamber, said chamber consisting of a lower and of an upper section and tubes connecting said two chamber sections, said compressed steam carrying chamber sections and tubes being encased by said exhaust gases carrying chamber sections and tubes, means in said heating chamber to reverse the inflow direction of the exhaust gases and to conduct said gases in a countercurrent flow to the flow direction of the compressed steam.

8. A steam and fuel power plant comprising in a closed steam circuit system a steam boiler, a turbine, means to conduct the steam from said boiler to said turbine, a Diesel steam compressor, means to withdraw a larger portion of the steam from the said turbine for circulation through the said circuit system, air and fuel inlet and exhaust gas outlet members for the compressor, means to supply fuel to the said fuel inlet members and combustion air to the said air inlet members, a cylinder in said compressor and free oscillating coaxial pistons in said cylinder, a steam generating space within said boiler, means to supply feed water to said steam generating space, a heating chamber within said boiler to utilize the heat of the exhaust gases to heat the compressed steam and to generate steam from the water within the boiler, means to conduct the exhaust gases from said compressor to said heating chamber, the latter consisting of a lower and of an upper section and of tubes connecting said two chamber sections, a chamber within said boiler for carrying the compressed steam, means to conduct the compressed steam from said compressor to said compressed steam carrying chamber, said chamber consisting of a lower and of an upper section and tubes connecting said two chamber sections, said compressed steam carrying chamber sections and tubes being encased by said exhaust gases carrying chamber sections and tubes, means in the said heating chamber to reverse the inflow direction of the exhaust gases and to conduct said gases in a countercurrent flow to the flow direction of the compressed steam, and expansion nozzles at the entering point of said exhaust gases from said upper chamber section into the tubes of said heating chamber.

9. A steam and fuel power plant comprising in a closed circuit system a steam boiler, a steam turbine provided with a high pressure and a low pressure drum, a gas turbine, means to conduct the steam from said boiler to the high pressure drum of said steam turbine, a Diesel steam compressor, a pipe system to withdraw the larger portion of the steam from said high pressure drum and to conduct the same to said compressor, air and fuel inlet and exhaust outlet members for said compressor, means to supply fuel to the said fuel inlet members and air to the said air inlet members, a steam cooler composed of tubes inserted in said steam conducting pipe system, means to conduct the fresh combustion air through said cooler prior to the entry of the air into said air inlet members, means to conduct the smaller portion of the steam to the low pressure drum of said steam turbine, a condenser for the condensation of said smaller steam portion, means to successively contact said condensate with said compressor with the steam conducted from said turbine to said compressor and to thereby preheat the same, a steam generating space within said boiler, means to supply said preheated condensate to said steam generating space, a heating chamber within said boiler, to utilize the heat of the exhaust gases to heat the compressed steam and to generate steam from the water within the boiler, means to conduct the exhaust gases from said compressor to said heating chamber, a chamber within said boiler for carrying the compressed steam, said chamber being arranged in heat conductive relation to said exhaust gases carrying chamber and means to conduct the compressed steam from said compressor to said compressor steam carrying chamber, and means to conduct the exhaust gases from said heating chamber to said gas turbine.

JOSEPH GAISBERGER.